(12) United States Patent
Ogawa et al.

(10) Patent No.: US 8,088,515 B2
(45) Date of Patent: Jan. 3, 2012

(54) ELECTRODE AND LITHIUM-ION SECONDARY BATTERY

(75) Inventors: Kazuya Ogawa, Tokyo (JP); Kiyonori Hinoki, Tokyo (JP); Yousuke Miyaki, Tokyo (JP)

(73) Assignee: TDK Corporation, Tokyo (JP)

( * ) Notice: Subject to any disclaimer, the term of this patent is extended or adjusted under 35 U.S.C. 154(b) by 618 days.

(21) Appl. No.: 12/056,515

(22) Filed: Mar. 27, 2008

(65) Prior Publication Data

US 2008/0318130 A1    Dec. 25, 2008

(30) Foreign Application Priority Data

Mar. 29, 2007 (JP) ................ P2007-088994

(51) Int. Cl.
*H01M 4/13* (2010.01)
*H01M 4/02* (2006.01)
(52) U.S. Cl. ............ 429/231.95; 429/209; 429/122
(58) Field of Classification Search ........ 429/231.95, 429/209, 122
See application file for complete search history.

(56) References Cited

FOREIGN PATENT DOCUMENTS

| JP | A-09-007602 | 1/1997 |
|----|-------------|--------|
| JP | A-2000-106174 | 4/2000 |
| JP | A-2000-243383 | 9/2000 |
| JP | 2003-157852 | * 5/2003 |
| JP | A-2003-257422 | 9/2003 |

OTHER PUBLICATIONS

English-language translation of Jun. 15, 2011 Office Action issued in Chinese Application No. 200810088602.1.

* cited by examiner

*Primary Examiner* — Helen O Conley
(74) *Attorney, Agent, or Firm* — Oliff & Berridge, PLC

(57) ABSTRACT

An electrode is provided as one that can suppress generation of hydrogen and that has sufficiently low impedance. The electrode has an aluminum current collector, an aluminum hydroxide layer provided on the aluminum current collector, and an active material layer containing lithium-containing metal oxide and provided on the aluminum hydroxide layer. The thickness of the aluminum hydroxide layer is not more than 50 nm.

9 Claims, 4 Drawing Sheets

Fig.4

| | 40°C 90RH% STORAGE TIME BEFORE PRESS [h] | THICKNESS OF ALUMINUM HYDROXIDE LAYER [nm] | BLISTER OCCURRENCE RATE AFTER 30°C 80RH% 1-WEEK STORAGE AFTER PRESS [%] | IMPEDANCE AT 1kHz [mΩ] |
|---|---|---|---|---|
| EXAMPLE 1 | 3 | 10.5 | 2 | 60.3 |
| EXAMPLE 2 | 6 | 19 | 0 | 64.1 |
| EXAMPLE 3 | 10 | 30 | 0 | 70.2 |
| EXAMPLE 4 | 18 | 50 | 0 | 73.4 |
| EXAMPLE 5 | 1 | 6.3 | 83 | 58.5 |
| EXAMPLE 6 | 2 | 8.7 | 21 | 59.3 |
| COMPARATIVE EXAMPLE 1 | 24 | 70 | 0 | 92 |
| COMPARATIVE EXAMPLE 2 | 31 | 88 | 0 | 124 |
| COMPARATIVE EXAMPLE 3 | 45 | 128 | 0 | 153 |
| COMPARATIVE EXAMPLE 4 | 55 | 146 | 0 | 163 |

US 8,088,515 B2

ELECTRODE AND LITHIUM-ION SECONDARY BATTERY

BACKGROUND OF THE INVENTION

1. Field of the Invention

The present invention relates to an electrode and a lithium-ion secondary battery.

2. Related Background Art

A conventionally known electrode used in a lithium-ion secondary battery has a structure in which an active material layer containing a lithium-containing metal oxide, a conductive aid, and a binder is provided on an aluminum current collector. This electrode is made by applying a paste containing the lithium-containing metal oxide, the conductive aid, the binder, and a solvent, onto the aluminum current collector and drying it (cf. Japanese Patent Application Laid-open Nos. 2003-257422 and 2000-106174).

SUMMARY OF THE INVENTION

When the lithium-containing metal oxide comes into contact with water, it exhibits strong alkalinity and in this situation the following reaction tends to take place between aluminum and water to generate hydrogen.

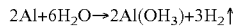

The electrode easily generating hydrogen is problematic in safety, and we found the following fact. With the active material layer pressed, hydrogen gas generated is unlikely to penetrate through the active material layer and there is no way to go out for hydrogen. Then hydrogen pushes the active material layer up to cause the so-called blister: the active material layer is peeled off like spots from the aluminum current collector to rise. The electrode subjected to the blister sometimes has insufficient performance.

For remedying this problem, it can be contemplated that the electrode is covered by a material resistant to penetration of water, to suppress contact between water and aluminum, thereby preventing the generation of hydrogen. In this case, however, there is concern of increase in impedance of the battery.

The present invention has been accomplished in view of the above problem and an object of the invention is to provide an electrode that can suppress generation of hydrogen and that has sufficiently low impedance.

The inventors found the following by investigation: before the press process of the active material layer, the electrode was stored in a place containing a considerable amount of water vapor, to form an aluminum hydroxide layer between the aluminum current collector and the active material layer, and the press process was carried out thereafter; then the generation of hydrogen was suppressed and little blister occurred even if the electrode was stored thereafter in a high-humidity place. In addition, no serious problem occurs as to the impedance if the thickness of the aluminum hydroxide layer is appropriately set.

An electrode according to the present invention comprises: an aluminum current collector having an aluminum hydroxide layer, an active material layer containing a lithium-containing metal oxide and provided on the aluminum hydroxide layer, and a thickness of the aluminum hydroxide layer is not more than 50 nm.

According to the present invention, the aluminum current collector has the aluminum hydroxide layer, whereby the generation of hydrogen is suppressed. Since the thickness of the aluminum hydroxide layer is not more than 50 nm, the increase of impedance is suppressed. If the thickness of the aluminum hydroxide layer is larger than 50 nm, a possibility of peeling of the active material layer becomes higher.

The occurrence of the blister can be significantly suppressed particularly, when the aluminum hydroxide layer is not less than 10 nm.

A lithium-ion secondary battery according to the present invention comprises the above-described electrode.

The present invention provides the electrode being capable of suppressing the generation of hydrogen and having sufficiently low impedance.

BRIEF DESCRIPTION OF THE DRAWINGS

FIG. 4 is a table showing the conditions and results in examples and comparative examples.

Figure 1:
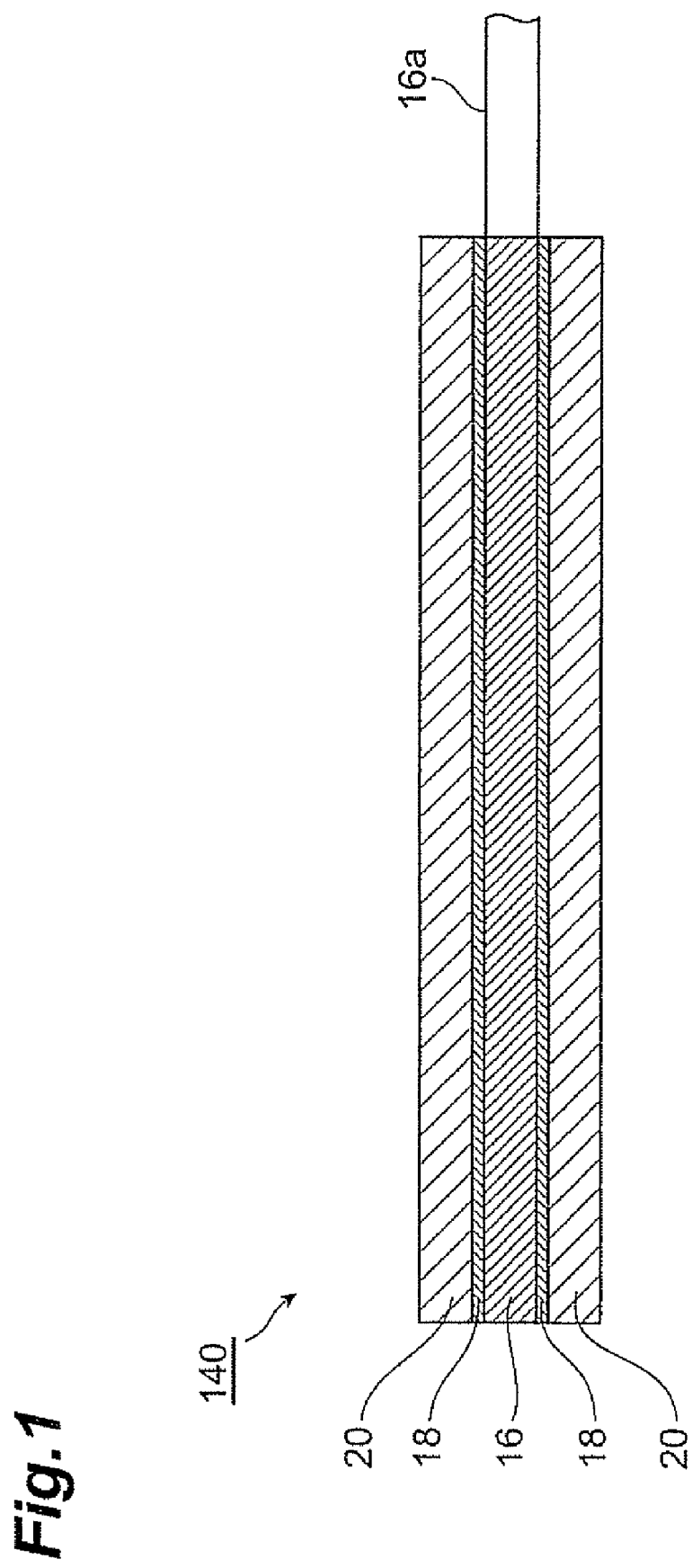
FIG. 1 is a partly cross-sectioned schematic configuration diagram of a cathode according to an embodiment of the present invention.

16 aluminum current collector; 18 aluminum hydroxide layer; 20 active material layer; 140 cathode (electrode); 100 lithium-ion secondary battery.

DESCRIPTION OF THE PREFERRED EMBODIMENTS

A preferred embodiment of application of the present invention will be described below in detail with reference to the drawings. The same elements will be denoted by the same reference symbols in the description of the drawings as much as possible, and redundant description will be omitted in some cases.

(Cathode)

A cathode 140 has an aluminum current collector 16 functioning as a current collector, aluminum hydroxide ($Al(OH)_3$) layers 18, 18 formed on the two sides of the aluminum current collector 16, and active material layers 20, 20 provided on the respective aluminum hydroxide layers 18, 18.

There are no particular restrictions on the thickness of the aluminum current collector 16, but the thickness can be, for example, 5 to 100 μm. A tongue-like portion 16a is formed as an outward extension at an end of the aluminum current collector 16.

The active material layer 20 is a layer containing a lithium-containing metal oxide as an active material, a conductive aid, a binder, and so on.

As a lithium-containing metal oxides, for example, there may be mentioned lithium cobaltate ($LiCoO_2$), lithium nickelate ($LiNiO_2$), lithium manganese spinel ($LiMn_2O_4$), composite metal oxides represented by general formula: $LiNi_xCo_yMn_zO_2$ (x+y+z=1), lithium vanadium compounds ($LiV_2O_5$), olivine type $LiMPO_4$ (wherein M is Co, Ni, Mn, or Fe), lithium titanate ($Li_4Ti_5O_{12}$), and so on.

Particularly, lithium-containing metal oxides that exhibit strong alkalinity upon contact with water, e.g., pH 10 or higher, are especially effective to the present invention. The degree of alkalinity can be evaluated as follows. For example, 5 wt % of the active material is mixed in pure water, the mixture is stirred for about ten minutes with a stirrer, then the mixture is left for 30 minutes, a supernatant solution is sampled, and its pH is measured with a pH meter or the like. Examples of such lithium-containing metal oxides exhibiting strong alkalinity include those listed in Table 1 below. The Li-containing metal oxides can vary the degree of alkalinity depending not only on the composition of the active material, but also on the production method thereof. The lithium-containing metal oxides containing nickel tend to demonstrate a high pH, as shown in Table 1, and are thus suitable for the present invention. The materials with the molar ratio of Ni of not less than 0.8 relative to the molar ratio of Li of 1 show the pH of not less than 11.7 and are particularly suitable for the present invention.

TABLE 1

| ACTIVE MATERIAL | pH |
|---|---|
| $Li(Ni_{1/3}Co_{1/3}Mn_{1/3})O_2$ | 10.7 |
| $Li(Ni_{0.8}Co_{0.1}Mn_{0.1})O_2$ | 11.7 |
| $Li(Ni_{0.8}Co_{0.15}Al_{0.05})O_2$ | 11.7 |
| $LiCoO_2$ | 10.1 |
| $Li_4Ti_5O_{12}$ | 11.2 |
| $LiNiO_2$ | 11.9 |
| $Li(Ni_{1/3}Co_{1/3}Mn_{1/3})O_2:LiMn_2O_4 = 1:1$ | 10.3 |

There are no particular restrictions on the conductive aids as long as it can enhance the electric conductivity of the active material layer 20, and any one of the well-known conductive aids can be used. As a conductive aids, for example, there may be mentioned carbon blacks, carbon materials, fine powders of metals such as copper, nickel, stainless steel, and iron, mixtures of the carbon materials and metal fine powders, and electrically conductive oxides such as ITO. It is noted that the present invention can be carried out without containing the conductive aid.

There are no particular restrictions on the binder as long as it can bind particles of the active material and particles of the conductive aid to the aluminum current collector 16, and any one of the well-known binders can be used. There may be mentioned, for example, fluorocarbon polymers such as polyvinylidene fluoride (PVDF), polytetrafluoroethylene (PTFE), tetrafluoroethylene-hexafluoropropylene copolymer (FEP), tetrafluoroethylene-perfluoroalkylvinyl ether copolymer (PEA), ethylene-tetrafluoroethylene copolymer (ETFE), polychlorotrifluoroethylene (PCTFE), an ethylene-chlorotrifluoroethylene copolymer (ECTFE), polyvinyl fluoride (PVF); styrene-butadiene rubber (SBR), and so on.

There are no particular restrictions on the thickness of the active material layer 20, but the thickness can be, for example, 10 to 200 μm. A supported amount of the cathode active material per unit area of the surface of the aluminum current collector 16 is preferably, for example, 4.0 to 35.0 mg/cm$^2$.

In the present embodiment, particularly, the aluminum hydroxide layer 18 exists between the aluminum current collector 16 and each active material layer 20. The thickness of the aluminum hydroxide layer is preferably not more than 50 nm in order to achieve sufficiently low impedance. If the thickness is not less than 10 nm, the occurrence of the blister is suppressed particularly well.

This aluminum hydroxide layer 18 is preferably formed throughout the entire interface between the aluminum current collector 16 and the active material layer 20, but even in the case where the aluminum hydroxide layer 18 is formed in part of the interface between the aluminum current collector 16 and the active material layer 20, it is also feasible to suppress the generation of hydrogen and the occurrence of the blister, when compared with an electrode without the aluminum hydroxide layer 18.

This electrode may or may not be subjected to a press process such as roll press. The occurrence of the blister is suppressed in either case.

(Production Method of Cathode)

First, the aluminum current collector 16 is prepared. Next, a lithium-containing metal oxide powder as the cathode active material, the binder, and a necessary amount of the conductive aid are mixed in a solvent to prepare a paste, and this paste is applied onto the two sides of the aluminum current collector 16, for example, by the doctor blade method or the like, and dried to form the active material layers 20, 20.

Thereafter, this electrode is left in a high-humidity environment for a predetermined time, or the electrode is immersed in an alkaline aqueous solution, whereby aluminum hydroxide is formed in each of the surfaces of the aluminum current collector 16, thereby forming the aluminum hydroxide layer 18 between the aluminum current collector 16 and each active material layer 20.

When the electrode is left in the high-humidity environment, the relative humidity, temperature, time, and the like in the environment can be optionally set so as to form the aluminum hydroxide layer 18 in the thickness of not more than 50 nm and, preferably, not less than 10 nm. For example, preferred conditions are the environment with the relative humidity of 60-90%, the temperature of 25-60° C., and approximately 1-72 hours.

When the electrode is immersed in the alkaline aqueous solution, the pH, temperature, and immersion time can also be set similarly. As preferred alkaline aqueous solution, there may be mentioned aqueous solution of lithium hydroxide. The preferred pH of the alkaline aqueous solution is 11. The preferred immersion time is one hour.

The electrode with the aluminum hydroxide layers 18 formed in this manner can be pressed, for example, by a roll press machine or the like. The linear pressure of the roll press can be set, for example, to 10-5000 kgf/cm.

(Action and Effect)

Since this electrode has the aluminum hydroxide layer 18 between each active material layer 20 and the aluminum current collector 16, the generation of hydrogen is suppressed. The occurrence of the blister after long-term storage is also suppressed not only before the press process, but also after the press process. The occurrence of the blister is adequately suppressed, particularly, after long-term storage in a high-humidity environment, e.g., during the rainy season or the like. The impedance is also sufficiently low.

The reason why the effect of suppression of the blister is achieved is not clear yet, but a conceivable reason is as follows.

When the lithium-containing metal oxide in the active material layer 20 comes into contact with water, it exhibits strong alkalinity and in this situation the following reaction takes place between aluminum and water to generate hydrogen:

$$2Al+6H_2O \rightarrow 2Al(OH)_3+3H_2\uparrow.$$

When the active material layer is subjected to the press process, there is no way to go out for this hydrogen and the active material layer is peeled off from the aluminum current collector to cause the blister.

In the present invention, however, the aluminum hydroxide layer 18 is formed between the aluminum current collector 16 and each active material layer 20 before the press process of the active material layer. Therefore, this aluminum hydroxide layer 18 prevents the aluminum current collector 16 from coming into contact with water and occurrence of defects is also reduced in the aluminum hydroxide layer 18 due to the press process; it is therefore considered that the occurrence of the blister is suppressed even after subsequent storage of the electrode 140 in a high-humidity place.

(Lithium-Ion Secondary Battery)

Figure 2:
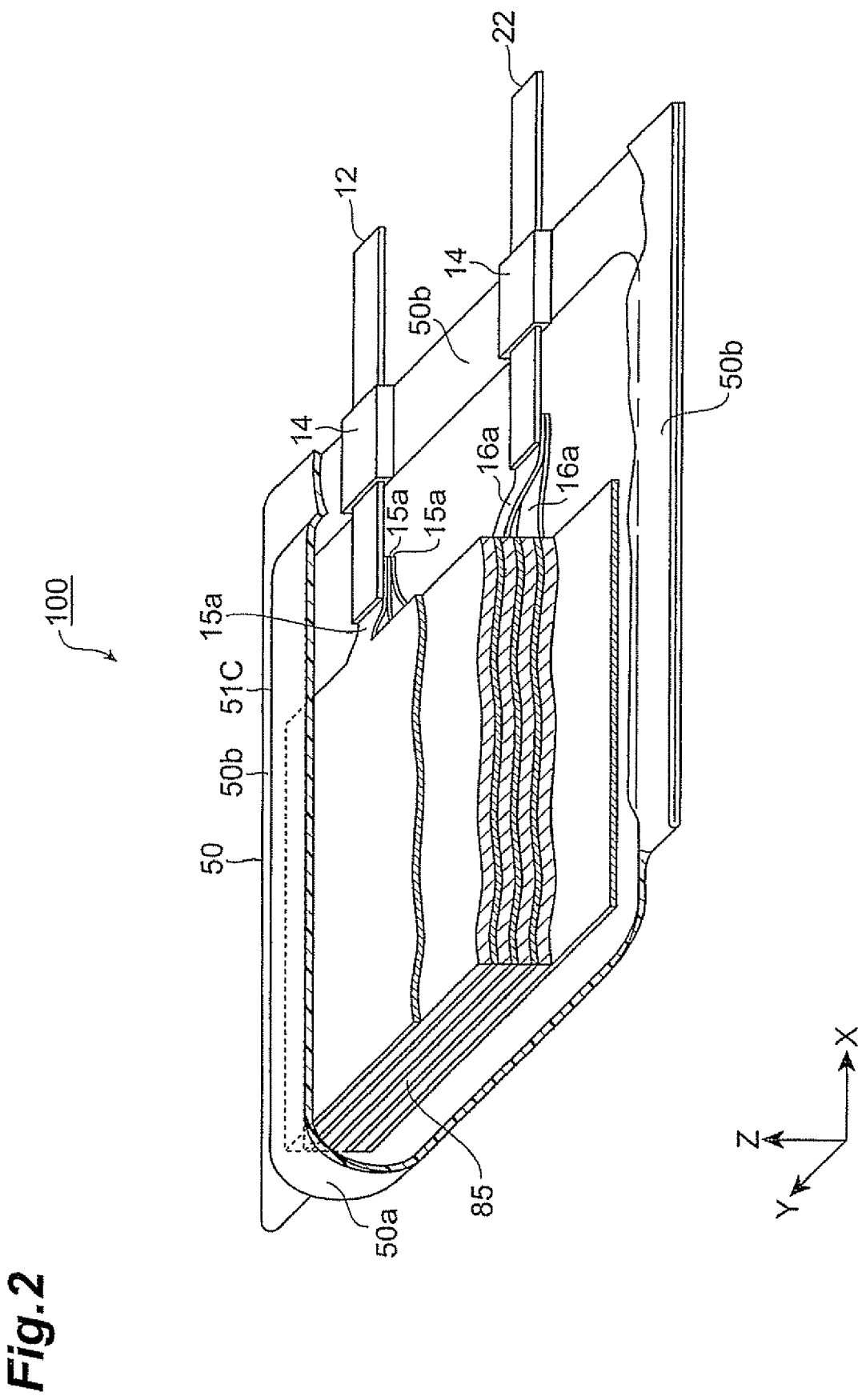
FIG. 2 is a partly broken perspective view of a lithium-ion secondary battery according to an embodiment of the present invention.
Figure 3:
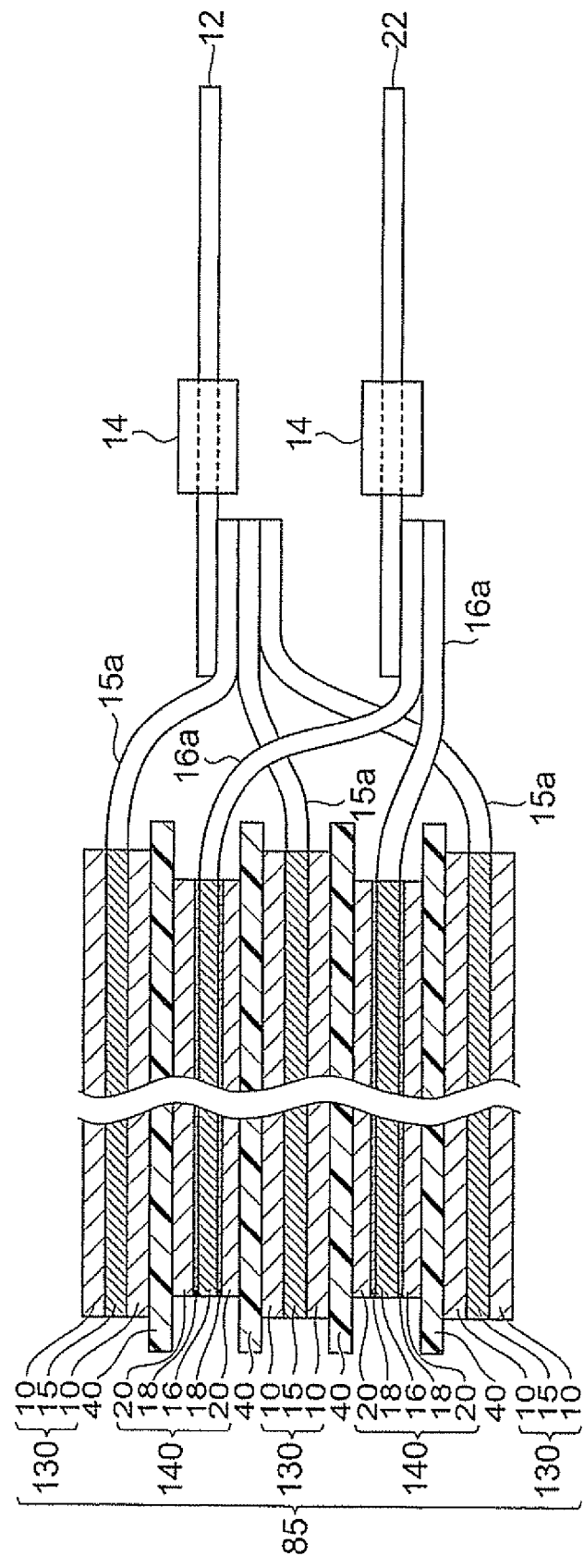
FIG. 3 is a sectional view along the ZX plane in FIG. 2.

An embodiment of the lithium-ion secondary battery according to the present invention will be described below in detail. FIG. 2 is a partly broken perspective view showing the lithium-ion secondary battery 100 of the embodiment of the present invention. FIG. 3 is a sectional view along the ZX plane of a laminate structure 85, a lead 22, and a lead 12 shown in FIG. 2.

The lithium-ion secondary battery 100 of the present embodiment is composed mainly of a laminate structure 85, a case (armor) 50 housing the laminate structure 85 in a hermetically closed state, and a lead 22 and a lead 12 for connection between the laminate structure 85 and the outside of the case 50.

The laminate structure 85 is a laminate, as shown in FIG. 3, obtained by laminating an anode 130, a separator 40, a cathode 140, a separator 40, an anode 130, a separator 40, a cathode 140, a separator 40, and an anode 130 in the order named from top. Each of the cathodes 140 is the above-described electrode. Each cathode 140 is laid so that its active material layers 20 are kept in contact with respective separators 40.

(Anode)

Each anode 130 has an anode current collector 15, and active material layers 10, 10 formed on the two faces of the anode current collector 15. The anode 130 is laid so that its active material layers 10 are kept in contact with respective separators 40.

There are no particular restrictions on a material of the anode current collector 15 as long as it is a metal material normally used as a current collector for the anode in the lithium-ion secondary battery. The material can be, for example, copper, nickel, or the like. A tongue-like portion 15a is formed as an outward extension of each current collector at an end of the anode current collector 15.

Each active material layer 10 is a layer containing an anode active material, a conductive aid, a binder, and so on.

There are no particular restrictions on the anode active material as long as it can implement reversible progress of occlusion and release of lithium ions, desorption and insertion of lithium ions, or doping and dedoping with lithium ions and counter anions thereto (e.g., $ClO_4^-$). Any one of the anode active materials in the well-known lithium-ion secondary battery elements can be used. For example there may be mentioned carbon materials such as natural graphite, artificial graphite, mesocarbon microbeads, mesocarbon fiber (MCF), cokes, glasslike carbon, and burned substances of organic compounds, metals such as Al, Si, and Sn capable of combining with lithium, amorphous compounds consisting primarily of an oxide such as $SiO_2$ or $SnO_2$; lithium titanate ($Li_4Ti_5O_{12}$), and so on.

Among the materials as mentioned above, the carbon materials are preferably applicable. Particularly, the active material is more preferably one of the carbon materials with the interlayer distance $d_{002}$ of 0.335-0.338 nm and the crystallite size $Lc_{002}$ of 30-120 nm. Use of such materials permits more efficient progress of occlusion and release of lithium ions, or desorption and insertion of lithium ions. The carbon materials satisfying these conditions include artificial graphite, MCF, and so on. The interlayer distance $d_{002}$ and the crystallite size $Lc_{002}$ can be determined by X-ray diffractometry.

In the present embodiment, particularly, a supported amount of the anode active material in the active material layers 10 is preferably 2.0 to 20.0 mg/cm$^2$. The supported amount herein is a weight of the anode active material per unit area of the surface of the anode current collector 15.

The constituent elements except for the active material in the active material layers 10 can be the same materials as those forming the active material layers 20. The active material layers 10 also preferably contain the same conductive aid as the active material layers 20.

(Separator)

Each separator 40 disposed between the active material layer 10 and the active material layer 20 is made of an electrically insulating porous material. There are no particular restrictions on the material of the separators 40, any one of the well-known separator materials can be used. As an electrically insulating porous materials, for example, there may be mentioned monolayer or multilayer bodies of film of polyethylene, polypropylene, or polyolefin, stretched films of mixtures of the foregoing polymers, nonwoven fabric of fiber consisting of at least one constituent material selected from the group consisting of cellulose, polyester, and polypropylene, and so on.

In the laminate structure 85, as shown in FIG. 3, on the plane view thereof the areas of the separators 40, the active material layers 10 (or anodes 130), and the active material layers 20 (or cathodes 140) decrease in the order named, the end faces of the active material layers 10 are projecting outward from the end faces of the active material layers 20, and the end faces of the separators 40 are projecting outward from the end faces of the active material layers 10. This configuration facilitates the following: if the layers have some positional deviation in the direction intersecting with the lamination direction because of errors or the like during production, the entire surface of the active material layers 20 can face the active material layers 10 in the laminate structure 85. Therefore, lithium ions released from each active material layer 20 are adequately taken through the separator 40 into the active material layer 10. Furthermore, since the separators 40 are larger than the active material layers 20 and the active material layers 10 and projecting from the end faces of the active material layers 20 and the active material layers 10, this configuration reduces short circuits due to contact between the active material layers 20 and the active material layers 10.

(Electrolyte Solution)

The electrolyte solution is contained in the active material layers 10, the active material layers 20, and the separators 40. There are no particular restrictions on the electrolyte solution, and the electrolyte solution can be, for example, an electrolyte solution (an aqueous electrolyte solution, or an electrolyte solution using an organic solvent) containing a lithium salt, which is used in the well-known lithium-ion secondary battery elements. However, the aqueous electrolyte solution has a low electrochemical decomposition voltage and thus the withstanding voltage in charging is limited to a low level; therefore, it is preferable to adopt an electrolyte solution using an organic solvent (i.e., a nonaqueous electrolyte solution). The electrolyte solution of the secondary battery elements preferably used herein is a nonaqueous electrolyte solution in which a lithium salt is dissolved in a nonaqueous solvent (an organic solvent). The lithium salt used herein can be, for example, one of salts such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB These salts may be used singly or in combination of two or more.

Any one of solvents in the well-known secondary battery elements can be used. Preferably, for example, there may be mentioned propylene carbonate, ethylene carbonate, diethyl carbonate, and so on. These may be used singly or as a mixture of two or more at any ratio. Since the solvent composition significantly affects the safety, it was necessary before to select the solvent composition with consideration to the safety. However, the battery of the present invention generates little heat upon nail penetration, and thus offers a broad range of choices for the solvent composition, while being adaptable for any solvent composition.

In the present embodiment the electrolyte solution may be a gel electrolyte obtained by adding a gelatinizing agent, as well as the liquid electrolyte. A solid electrolyte (a solid polymer electrolyte or an electrolyte consisting of an ion-conductive inorganic material) may be contained instead of the electrolyte solution.

(Leads)

The lead 22 and lead 12 have a ribbon-like contour and are projecting outward through a sealed portion 50b from the interior of the case 50.

The lead 22 is made of a conductive material such as metal. For example, aluminum or the like can be employed as this conductive material. The end of the lead 22 in the case 50 is joined to each of the tongue-like portions 16a, 16a of the respective cathode current collectors 16, 16 by resistance welding or the like, as shown in FIG. 3, and the lead 22 is electrically connected through each cathode current collector 16 to each active material layer 20.

On the other hand, the lead 12 is also made of a conductive material such as metal. For example, a conductive material such as copper or nickel can be used as this conductive material. The end of the lead 12 in the case 50 is welded to each of the tongue-like portions 15a, 15a, 15a of the respective anode current collectors 15, 15, 15 and the lead 12 is electrically connected through each anode current collector 15 to each active material layer 10.

Each of portions of the leads 22, 12 pinched by the sealed portion 50b of the case 50 is covered by an insulator 14 such as resin, as shown in FIGS. 2 and 3, in order to enhance the sealing performance. There are no particular restrictions on the material of the insulators 14, but each insulator is preferably made, for example, of a synthetic resin. The lead 22 and the lead 12 are separated from each other in the direction perpendicular to the lamination direction of the laminate structure 85.

(Case)

There are no particular restrictions on the case 50 as long as it can hermetically seal the laminate structure 85 and prevent intrusion of air and water into the case, and any one of cases in the well-known secondary battery elements can be used. For example, the case made of synthetic resin such as epoxy resin, or made by laminating metal sheet of aluminum or the like with resin can be used. The case 50, as shown in FIG. 2, is one obtained by folding a rectangular flexible sheet 51C into two parts on a nearly longitudinal center thereof, and sandwiches the laminate structure 85 between them on both sides in the lamination direction (up and down direction). Among the edges of the sheet 51C folded into two parts, sealed portions 50b of three sides except for a folded portion 50a are bonded by heat sealing or with an adhesive to hermetically seal the laminate structure 85 inside. The case 50 is bonded to the insulators in the sealed portion 50b to seal the leads 22, 12.

Since this lithium-ion secondary battery 300 adopts the cathodes 140 resistant to the occurrence of the blister, the yield thereof can be increased.

The present invention is not limited to the above embodiments, but can be modified in various ways. For example, the cathode 140 in FIG. 1 has the active material layers 20 and the aluminum hydroxide layers 18 on the two sides of the current collector 16, but the electrode can be one in which an active material layer 20 and an aluminum hydroxide layer 18 are formed on only one side.

FIG. 3 shows the laminate in which a plurality of cathodes and anodes are stacked, but the battery may be one having only a pair of a cathode and an anode.

Example 1

Preparation of Cathodes

The cathodes were prepared according to the following procedure. 45 parts by weight of each of $LiMn_{0.33}Ni_{0.33}Co_{0.34}O_2$ (where the numerals in the formula represent an atomic ratio) with the pH of 10.7 and $LiMn_2O_4$ with the pH of 7.5 as a cathode active material, 6 parts by weight of acetylene black as a conductive aid, and 4 parts by weight of polyvinylidene fluoride (PVdF) as a binder were mixed and dispersed with a planetary mixer, and an appropriate amount of NMP was added to adjust the viscosity, thereby obtaining a coating solution of a slurry form.

The coating solution obtained was applied in the active material-supported amount of 22.5 mg/cm$^2$ onto an aluminum foil (20 μm) as a current collector by the doctor blade method, and dried. The dried electrode sheet was stored in a 40° C. 90%-humidity environment for three hours to form aluminum hydroxide layers 10.5 nm thick. This cathode sheet was pressed with calendar rolls so as to achieve the porosity of 30% in the active material layers. The cathode sheet after the press was punched in the size of 30.5 mm×41 mm to obtain cathodes.

(Evaluation of Cathodes)

For evaluating the storage stability of the electrodes, each electrode after the press was stored in a 30° C. 80%-humidity environment for one week and a rate of occurrence of the blister was checked for the electrodes. The blister occurrence rate is a percentage of the number of electrodes in which the blister occurrence was observed, to a hundred electrodes after the press. The thickness of the aluminum hydroxide film was measured from a photograph of a cross section before the press in the cathodes. There was little variation in the thickness of the aluminum hydroxide film before and after the press. The results are shown in FIG. 4.

(Preparation of Anodes)

92 parts by weight of natural graphite as an anode active material and 8 parts by weight of PVdF as a binder were mixed and dispersed with a planetary mixer and thereafter an appropriate amount of NMP was added to adjust the viscosity, thereby obtaining a coating solution of a slurry form. The coating solution obtained was applied in the active material-supported amount of 10.5 mg/cm$^2$ onto a copper foil (15 μm) as a current collector by the doctor blade method, and dried. The anode sheet thus produced was pressed with calendar rolls so as to achieve the porosity of 30% in the active material layers. The anode sheet after the press was punched in the size of 31 mm×41.5 mm.

(Fabrication of Battery)

Next, pairs of cathodes and anodes were stacked in ten layers so that a polyolefin separator (thickness: 25 μm, Gurley aeration time: 100 sec) punched in the size of 32 mm×43 mm was interposed between each pair of cathode and anode, and the two end faces of the stack were thermally compressed to obtain a battery laminate. The both of the cathodes and anodes were extended in part in a ribbon shape to form connection terminals. The electrolyte solution used herein was a non-aqueous electrolyte solution in which a solvent was propylene carbonate (PC), ethylene carbonate (EC), and diethyl carbonate (DEC) at the volume ratio of 2:1:7, the solute was LiPF$_6$ of 1 mol dm$^{-3}$, and 1,3-propane sultone (5 parts by weight) was dissolved.

Using the nonaqueous electrolyte solution and the laminate obtained in the above steps, a multilayer lithium-ion secondary battery was fabricated according to the following procedure. The above-described electrode group was inserted into an armor consisting of an aluminum laminate film. The electrode group was kept set in the armor in a vacuum vessel, and the aforementioned nonaqueous electrolyte solution was poured into the armor to impregnate the electrode group with the nonaqueous electrolyte solution. After completion of impregnation with the nonaqueous electrolyte solution, an unsealed portion of the armor was sealed in a reduced pressure state to obtain a multilayer lithium-ion secondary battery.

(Evaluation of Battery)

The impedance of the battery thus fabricated was measured in a 3.8V charged state. The measurement result is shown in FIG. 4.

Examples 2-6

Batteries of Examples 2-6 were fabricated in the same manner as in Example 1, except that the time of storage of the cathodes in the 40° C. 90%-humidity environment after the applying and drying in Example 1 was changed to 6 hours, 10 hours, 18 hours, 1 hour, or 2 hours, respectively. The measurement results are shown in FIG. 4.

Comparative Examples 1-4

Batteries of Comparative Examples 1-4 were fabricated in the same manner as in Example 1, except that the time of storage of the cathodes in the 40° C. 90%-humidity environment after the application and drying in Example 1 was changed to 24 hours, 31 hours, 45 hours, or 55 hours, respectively. The measurement results are shown in FIG. 4.

As shown in FIG. 4, the impedance values are good when the thickness of the aluminum hydroxide layers is not more than 50 nm. Furthermore, the blister occurrence rate can be considerably lowered in the examples in which the aluminum hydroxide layers are formed in the thickness of not less than 10 nm.

What is claimed is:

1. An electrode comprising:
    an aluminum current collector having an aluminum hydroxide layer; and
    an active material layer containing a lithium-containing metal oxide, the active material layer provided on the aluminum hydroxide layer, wherein
    a thickness of the aluminum hydroxide layer is not more than 50 nm, and
    the aluminum hydroxide layer is present throughout an entire interface of the aluminum current collector and the active material layer.

2. The electrode according to claim 1, wherein the thickness of the aluminum hydroxide layer is not less than 10 nm.

3. The electrode according to claim 1, wherein the lithium-containing metal oxide is a lithium-containing metal oxide containing nickel.

4. The electrode according to claim 2, wherein the lithium-containing metal oxide is a lithium-containing metal oxide containing nickel.

5. A lithium-ion secondary battery comprising an electrode, the electrode comprising:
    an aluminum current collector having an aluminum hydroxide layer; and
    an active material layer containing a lithium-containing metal oxide, the active material layer provided on the aluminum hydroxide layer, wherein
    a thickness of the aluminum hydroxide layer is not more than 50 nm, and
    the aluminum hydroxide layer is present throughout an entire interface of the aluminum current collector and the active material layer.

6. The electrode according to claim 1, wherein the aluminum hydroxide layer consists essentially of aluminum hydroxide.

7. The lithium-ion secondary battery according to claim 5, wherein the aluminum hydroxide layer consists essentially of aluminum hydroxide.

8. The electrode according to claim 1, wherein the aluminum hydroxide layer is formed before the electrode is pressed.

9. The lithium-ion secondary battery according to claim 5, wherein the aluminum hydroxide layer is formed before the electrode is pressed.

* * * * *